United States Patent [19]

Hesse et al.

[11] Patent Number: 5,096,996

[45] Date of Patent: Mar. 17, 1992

[54] MODIFIED NOVOLAK TERPENE PRODUCTS

[75] Inventors: Wolfgang Hesse, Taunusstein; Erhard Leicht, Hofheim am Taunus; Richard Sattelmeyer, Weisbaden, all of Fed. Rep. of Germany

[73] Assignee: Hoechst Aktiengesellschaft, Fed. Rep. of Germany

[21] Appl. No.: 415,887

[22] Filed: Oct. 2, 1989

[30] Foreign Application Priority Data

Oct. 4, 1988 [DE] Fed. Rep. of Germany ....... 3833656

[51] Int. Cl.$^5$ ..................... C08G 8/04; C08G 14/02; C08L 61/04
[52] U.S. Cl. ..................... 528/129; 523/149; 525/133.5; 525/501.5; 528/143; 528/155; 528/158.5
[58] Field of Search ...................... 523/149; 525/501.5, 525/133.5; 528/143, 155, 158.5, 129

[56] References Cited

U.S. PATENT DOCUMENTS

| | | | |
|---|---|---|---|
| 2,321,626 | 6/1943 | Rosenblum | 528/129 |
| 2,411,557 | 11/1946 | Schuh | 528/129 |
| 4,073,826 | 5/1975 | Galkiewicz | 528/129 |

Primary Examiner—Harold D. Anderson
Assistant Examiner—T. Mosley
Attorney, Agent, or Firm—Bierman and Muserlian

[57] ABSTRACT

Modified novolaks based on phenols which are trifunctional with respect to formaldehyde and contain, as modifying components, terpenes and unsaturated carboxylic acids or derivatives of these compounds, the weight ratio between the terpenes and the unsaturated carboxylic acids or derivatives thereof being in the range from 98.5:2.5 to 2.5:98.5 and the weight ratio between the phenolic component and the sum of the modified components being in the range from 95:5 to 5:95 and the modified novolaks having a melting point greater than 45° C.

Process for the preparation of the modified novolaks by admixing the modifying components indicated with non-modified novolaks in the necessary amounts at temperatures between 80° and 300° C.

Use of the modified novolaks as reinforcing resins for rubber and elastomers, as tackifying agents for rubber, as binders for friction linings, curable molding compositions, impregnants, coatings, paints and binders for finely divided inorganic substrates.

11 Claims, No Drawings

MODIFIED NOVOLAK TERPENE PRODUCTS

DESCRIPTION

The invention relates to modified novolaks based on phenols which are trifunctional with respect to formaldehyde, which novolaks contain, as modifying components, terpenes and unsaturated carboxylic acids or derivatives of these compounds, to a process for the preparation thereof, and the use thereof, preferably as reinforcing resins for rubber and elastomers, as tackifiers for rubber, as binders for friction linings, curable molding compositions, impregnants, coatings, paints and binders for inorganic substrates with fine particles.

It is known to boil down novolaks comprising alkyl- or arylphenols with unsaturated fatty oils, the fatty acids which can be obtained therefrom or the derivatives thereof, such as amides or esters, to give binders for air- or oven-drying paints or printing inks. In this operation, viscous soft resins are formed which dry oxidatively.

It is furthermore known to substitute phenols which have at least one free ring hydrogen in the ortho- or para-position to the phenolic hydroxyl group with terpenes in the presence of Lewis or protonic acids. This gives relatively low-molecular-weight synthetic resins which have a relatively high melting point, but which cannot be crosslinked further.

The prior art also includes transesterifying acetylated novolaks using fatty acids or esterifying novolaks using fatty acids in the presence of catalysts. If a significant number of phenolic hydroxyl groups are still present after the reaction, resins of this type can, if desired, be subjected to crosslinking reactions. However, they are high-viscosity liquids or viscous soft resins without melting points which cannot be used in this form, for example in rubber technology and in other applications in which, as is the case in the preparation of friction linings, curable molding compositions or sinter paints, i.e. in all applications in which a grindable intermediate is required.

However, there is considerable technical interest in hydrophobically substituted, but nevertheless crosslinkable and grindable novolaks, since they have considerably better compatibility with hydrophobic substrates. In addition, it is desirable to control the crosslinking rate of novolak/crosslinking agent mixtures at the given temperature. It is furthermore desirable to reduce the high brittleness of the crosslinking products of novolaks.

Surprisingly, it has now been found that these difficulties can be overcome by means of modified novolaks which contain, as modifying components, terpenes and unsaturated carboxylic acids and/or derivatives of these compounds.

The invention therefore relates to modified novolaks based on phenols which are trifunctional with respect to formaldehyde, which novolaks contain, as components, terpenes and unsaturated carboxylic acids and/or derivatives of these compounds, the weight ratio between the terpenes and the unsaturated carboxylic acids or derivatives thereof being in the range from 98.5:2.5 to 2.5:98.5, and the weight ratio between the phenolic component and the sum of the modifying components being in the range from 95:5 to 5:95, preferably between 90:10 and 10:90, and the modified novolaks having a melting point above 45° C., preferably above 55° C.

The crosslinking behavior, solubility, compatibility with other raw materials, plasticity and melting points of the novel resins according to the invention can be adjusted precisely in the desired range by means of the measures proposed, so that there is a wide variety of possible applications, in particular in the areas of use comprising rubber, friction and brake linings, curable molding compositions, coatings and paints, impregnants, binders for mineral substances and others. They exhibit particularly valuable properties when used as reinforcing resins for rubber based on polar and/or non-polar rubbers.

Modifying agents which can be used are terpenes and unsaturated carboxylic acids, preferably unsaturated carboxylic acids containing at least 4 carbon atoms, in particular unsaturated fatty acids and/or derivatives thereof.

Examples of terpenes which can be used are: terpinene, terpinols, limonene, alphapinene, betapinene, myrcene, cadinene, betaselinene, alcohols or ketones derived from these compounds, such as, for example, pullegone, carone, or the terpineols, and carboxyl-containing terpenes, such as abietic acid and isomers thereof. It is also possible to use naturally occurring or industrially prepared mixtures, such as terpentine oil or colophonium. The use of cyclic or polycyclic terpenes is preferred.

Examples of unsaturated carboxylic acids preferably used are: oleic acid, linoleic acid, linolenic acid, unsaturated fatty acid mixtures obtained on cracking of oils, such as, for example, linseed oil fatty acid, soya fatty acid, wood oil fatty acid, ricinoleic acid and ricinenic acid obtained therefrom by dehydration, amongst others. An example of a particularly preferred use is that of tall oil fatty acid containing between 0.1 to 30% by weight, preferably between 0.5 and 20 % by weight of resin.

Examples of carboxylic acid derivatives which can be used are the esters or mixed esters, for example, of the above mentioned carboxylic acids with mono- or polyalcohols, such as methanol, ethanol, propanol, butanol, methyl glycol, ethyl glycol, butyl glycol, ethylene glycol and its homologs, glycerol and pentaerythritol. It is also possible to use amides, monoalkyl- and dialkylamides of these carboxylic acids with alkyl radicals having 1 to 8, preferably 1 to 4, carbon atoms.

The modifying agents can be employed either individually or in mixtures.

The phenol components used for the preparation of the novolaks to be modified are trifunctional phenols, such as, for example, phenol, m-cresol, 3,5-dimethylphenol and resorcinol. These phenols can be admixed with phenols which are bifunctional toward aldehydes, such as, for example, p-cresol or o-cresol. The use of phenol and resorcinol is preferred, and the use of phenol is particularly preferred. Examples of suitable aldehydes are formaldehyde, acetaldehyde, propionaldehyde, butyraldehyde, isobutyraldehyde, valeraldehyde, hexyl aldehyde, heptyl aldehyde, octyl aldehyde, nonyl aldehyde and decyl aldehyde and isomers thereof. It is also possible to use even higher aldehydes. The use of formaldehyde is preferred.

The resins are prepared by reacting preformed novolaks in the melt or in solution with the modificants at temperatures between 80° and 300° C., preferably 100° and 290° C.

In this reaction, it is in principle immaterial, when various modificants are used, in what sequence they are employed or whether they are employed as a mixture. Although, in a concrete individual case, the resin properties may change if these conditions are varied, this is, however, a suitable way of producing desired material properties. When sulfuric acid or derivatives thereof are used as the catalyst, it is preferred not to add this at the beginning in one portion, but instead distribute it over the entire reaction time.

However, it is also possible to carry out the preparation of the modified novolaks by simultaneous reaction of the phenolic component, the aldehyde and the modificants. In this reaction, a procedure is preferably followed in which the phenol and a water-immiscible solvent, such as, for example, toluene, xylene or similar, and some of the catalyst are initially introduced. The mixture is then heated to the reaction temperature and the aldehyde, the modificants and the catalyst are run in simultaneously. The water of condensation and, if appropriate, the water used to dissolve the aldehyde component can be removed by azeotropic distillation. The volatile components are then removed by distillation, the final phase of the distillation preferably being carried out in vacuo. The catalyst can be neutralized after the reaction. When sulfuric acid or derivatives thereof are used, the neutralization may be superfluous since these are reductively destroyed by terpenes.

The novolaks modified according to the invention can be used as reinforcing resins for rubber and elastomers. To this end, they are incorporated into the still unvulcanized rubber or elastomer mixture together or separately with crosslinking agents, such as, for example, hexamethylenetetramine and/or aminoplastics and/or resols, if appropriate after a preliminary reaction.

Examples of rubber types which are suitable for the preparation of reinforced rubber are natural rubber, styrene-butadiene rubber, polybutadiene, polyisoprene, transpolyoctenylene-butyl rubber, ethylene-propylenediene terpolymer rubber or mixtures thereof, as are usually used in the tire industry or for the production of industrial rubber goods. Styrene-butadiene and natural rubber or mixtures of these types of rubber with minor amounts of other rubber types are preferred. They can be used in any desired supply form, for example as balls or powders and, for example, with carbon black. Polar rubbers, such as, for example, nitrile rubber (copolymers of acrylonitrile with butadiene or isoprene) or polyurethane rubber are furthermore suitable.

Examples of customary further additives in the rubber mixture are fillers, vulcanizing agents, accelerators, activators and processing auxiliaries.

The vulcanizates obtained according to the invention can be used, for example, as industrial rubber goods, such as antivibration elements, rubber gaiters, bellows, conveyor belts, but also for vehicle tires. In this case, the mixtures according to the invention can also be used in the layers which must have good adhesion to woven fabrics or meshes which have been laid in. In order to improve the adhesion, adhesion promoters, such as cobalt compounds or other metal compounds, and/or combinations thereof with silica, resorcinol and curing agents may additionally be used.

The content of novolaks in the rubber mixture is usually preferably between 2 and 80% by weight, relative to the rubber. In particular, 3 to 60% by weight, particularly preferably 5 to 20% by weight, of novolak are employed. In the case of curing using hexamethylenetetramine, addition of, preferably, 2 to 20% by weight, in particular 5 to 15% by weight, relative to novolak, is necessary. In the case of curing using aminoplastics or resols, addition of, preferably, 10 to 50% by weight, in particular 15 to 40% by weight, relative to novolak, is employed.

According to the prior art, however, reinforcing resins in rubber increase not only the hardness and stress values, but they also influence, in an undesired manner, the viscoelastic behavior of the rubber in a manner such that the viscous proportion is increased and mechanical work is converted into heat to an increased extent. This disadvantage is important for all rubber parts which, like parts of automobile tires, are subjected to strong mechanical actions during use. This property is known as heat build-up (HBU) and, in the case of reinforcing resins according to the prior art, is more pronounced the better the resin develops its reinforcing action Surprisingly, however, the novel novolaks modified according to the invention cause a reduced development of the HBU in addition to an extraordinary increase in the reinforcing properties. It is obvious here that, on the one hand, the fatty acid component of the reinforcing agent is responsible for the above-average development of the reinforcing properties, whereas, on the other hand, the terpene component suppresses the HBU in addition to causing a good improvement in the reinforcing properties. This property profile of the resins according to the invention is surprising.

The resins according to the invention can also serve as tackifiers for rubber, in particular for synthetic rubber. In the production of rubber articles comprising several layers, as is necessary, in particular, in the production of automobile tires, the customary non-vulcanized parts often do not have the adhesiveness which is necessary for assembly. This is the case, in particular, if the rubber mixture is composed predominantly or exclusively of synthetic rubber. The addition of resins according to the invention can now, however, effect an adequate increase in adhesiveness.

For this application of the novel resins, the concomitant use of curing agents is not necessary, but is nevertheless possible.

Further possible uses of the novel resins according to the invention are in the area of friction linings, impregnants for organic and/or inorganic fibers, binders for organic and/or inorganic fibers, coverings, coatings and paints, and binders for comminuted, preferably inorganic materials. In these applications, the novolaks modified according to the invention can be processed together with curing agents and also with fillers, additives, pigments and other added substances.

The invention is now illustrated in greater detail by means of the examples below. In the examples, parts are taken to mean parts by weight unless otherwise stated.

EXAMPLE 1

A) Preparation of a Tall Oil Fatty Acid/Alphapinene-Modified Novolak 600 g of a novolak prepared from phenol and formaldehyde and having a melting point of 74° C., a viscosity of 600 mPa.s/20° C. (1:1 in ethylene glycol) (Alnovol VPN 1322 from Hoechst AG) are melted in a 2 l flask fitted with stirrer, thermometer, reflux condenser and dropping funnel, 0.45 g of concentrated sulfuric acid is added, and 200 g of alphapinene are added at 120° C. over the course of one hour.

The temperature rises rapidly to 150° C. 1.8 g of sulfuric acid are added after the mixture has been stirred for one hour, a further 1.8 g after a further hour, and a further 1.8 g of sulfuric acid after a further hour, i.e. a total of 5.85 g of sulfuric acid.

After the final portion of sulfuric acid has been added, the mixture is stirred at 150° C. for a further hour, and 200 g of tall oil fatty acid (resin content 2% by weight) are subsequently added. The further reaction with tall oil fatty acid takes place over the course of three hours in the presence of a further three portions of 0.9 g of sulfuric acid added at hourly intervals. Then, after the last sulfuric acid has been consumed, the reaction mixture is again stirred at 150° C. for one hour and then heated to 210° C. on a falling condenser. When this temperature has been reached, the mixture is distilled for one hour under a water-pump vacuum. 55 g of distillate having a phenol content of 29.5% by weight are produced. 922 g of a tall oil fatty acid/alphapinene-modified novolak remain in the flask. The viscosity is 2400 mPa.s/20° C. (1:1 in ethylene glycol), the melting point is 86° C. and the acid number is 18.4 mg of KOH/g.

The mixture of the resin with hexamethylenetetramine in the ratio 9:1 cures within three minutes at 150° C. (B time in accordance with DIN 16916, part 2).

B) Testing of the novolak modified according to the invention from Example 1A) and of the starting novolak (Alnovol VPN 1322) as a reinforcing resin for rubber.

The base mixture used is a mixture of 100 parts of natural rubber RSS No. 2, 50 parts of carbon black N 330, 1.5 parts of stearic acid, 5 parts of zinc oxide RS, 1 part of Vulkanox HS, 1 part of Vulkanox 4010 NA, 2.5 parts of sulfur, 0.9 part of Vulkazit CZ and 0.3 part of thiuram MS. Apart from in the zero experiment, 9 parts of novolak and 1 part of hexamethylenetetramine or 14 parts of novolak and 6 parts of the melamine resin Additol VXT 3911 (manufacturer Hoechst AG) are used per 100 parts of rubber.

The novolak and curing agent are incorporated successively at 100° C. in a roll mill. The vulcanization temperature is 145° C. and the vulcanization time in the zero experiment is 20 minutes, in the case of curing with hexamethylenetetramine (Hexa) 45 minutes and in the case of curing with melamine resin (VXT) 60 minutes.

In Table 1 below, the column Shore A denotes the Shore A hardness measured at 23° C., and the columns Modulus 10 and Modulus 25 indicate the stress values in MPa produced on elongation of a standardized test specimen by 10 and 25% respectively, and the column Roll Bending Test (RB 15) relates to the heat build-up (HBU). It indicates the increase in temperature of the test specimen after 15 minutes. If a time is indicated instead of a temperature, this indicates the time after which the test specimen is destroyed as a result of overheating and does not pass the test.

TABLE 1

Testing of the rubber-technological properties of reinforcing resins

| Resin from | Cross-linking agent | Shore A | Modulus 10 | Modulus 25 | Roll Bending Test (RB 15) |
|---|---|---|---|---|---|
| none | — | 71 | 0.7 | 1.4 | 28° C. |
| Ex. 1A) | Hexa | 87 | 1.9 | 2.4 | 49° C. |
| Alnovol VPN 1322 | Hexa | 82 | 1.2 | 1.8 | 63° C. |
| Ex. 1A) | VXT | 93 | 3.5 | 4.3 | 112° C. |

TABLE 1-continued

Testing of the rubber-technological properties of reinforcing resins

| Resin from | Cross-linking agent | Shore A | Modulus 10 | Modulus 25 | Roll Bending Test (RB 15) |
|---|---|---|---|---|---|
| Alnovol VPN 1322 | VXT | 88 | 1.4 | 2.5 | 4 min |

EXAMPLE 2

Preparation of a Soya Fatty Acid/Alphapinene-Modified Novolak 658 parts of phenol, 150 parts of xylene, 1.8 parts of sulfuric acid (25% strength) and 90 parts of soya oil fatty acid are placed in a 2 l flask fitted with stirrer, thermometer, two dropping funnels, distillation attachment and water separator, and the mixture is heated to 130° C. At this temperature, a mixture of 411 g of an aqueous, 37% strength formaldehyde solution containing 3 g of sulfuric acid is added dropwise over the course of two hours. Water separation commences immediately after commencement of addition of the aqueous formaldehyde solution. When the water separation is complete, the mixture is heated for a further hour with circulation without temperature limitation, the water separator is removed and 20 parts of alphapinene are added to the batch. The mixture is left to reflux for a further hour, and the volatile components are subsequently distilled off on a falling condenser at a bottom temperature of 210° C. A water-pump vacuum is then applied, and the remaining volatile components are removed at 210° C. over the course of one hour. 729 parts of a soya oil fatty acid/alphapinene-modified novolak resin having a melting point of 82° C. and an acid number of 16 mg of KOH/g remain in the flask. The viscosity of a 50% strength solution in methoxyisopropanol is 2440 mPa.s/20° C. The curing period (B time) of a mixture of 9 parts of resin and 1 part of hexamethylenetetramine is 2 minutes and 15 seconds at 150° C.

EXAMPLE 3

658 parts of phenol, 150 parts of toluene and 1.8 parts of sulfuric acid (25% strength) are placed in a reaction vessel as described in Example 2, and the mixture is heated to 120° C. Two separate dropping funnels are used.

From one dropping funnel, a mixture of 397 parts of aqueous formaldehyde solution and 12.15 parts of sulfuric acid (25% strength) is run in over the course of three hours, uniformly distributed over the period, and a mixture of 20 parts of tall oil fatty acid and 180 parts of alphapinene is run in synchronously from the other dropping funnel. During this time, 340 parts of an aqueous distillate separate out in the water separator.

When the water separation is complete, the water separator is removed, and the volatile components are removed by distillation on a falling condenser at a bottom temperature of 200° C., a vacuum is applied, and the batch is treated for a further hour at 205° C. under a water-pump vacuum. The flask is then emptied. 811 parts of a modified novolak having a melting point of 98° C., a viscosity of 1300 mPa.s/20° C. (1:1 in methoxyisopropanol) are produced. The B time of a mixture of 9 parts of resin and 1 part of hexamethylenetetramine is 6.5 minutes at 150° C.

EXAMPLE 4

The procedure as in Example 3 is followed, but a mixture of 100 parts of tall oil fatty acid and 100 parts of alphapinene is used.

The yield is 786 g, the melting point 94° C. and the viscosity, determined as above, is 1600 mPa.s/20° C. The B time determined as described above is 4 minutes.

EXAMPLE 5

The procedure as in Example 3 is followed, but a mixture of 180 parts of tall oil fatty acid and 20 parts of alphapinene is used. The yield is 791 g.

The melting point is 88° C., the viscosity determined as above is 1200 mPa.s/20° C., and the B time determined as above is 2½ minutes.

EXAMPLE 6

658 parts of phenol, 150 parts of xylene, 1.8 parts of sulfuric acid (25% strength), 180 parts of colophonium and 20 parts of tall oil fatty acid are placed in a reaction vessel as described in Example 2, and the mixture is heated to 120° C. When this temperature has been reached, a mixture of 397 parts of aqueous formaldehyde (37% strength) and 24.3 parts of sulfuric acid (25% strength) are added over the course of three hours, distributed uniformly over the period.

When the circulation distillation is complete, the water separator is removed, and the volatile components are removed by distillation on a falling condenser at a bottom temperature of 205° C. The reaction mixture is subsequently aftertreated for a further hour at 205° C. under a water-pump vacuum. The yield is 776 g.

The melting point of the resin is 94° C., the viscosity, determined as above, is 1000 mPa.s/20° C., and the B time of a mixture of 9 parts of resin and 1 part of hexamethylenetetramine is 2½ minutes at 150° C.

EXAMPLE 7

The procedure as in Example 6 is followed, but 20 parts of colophonium and 180 parts of tall oil fatty acid are initially introduced. The yield is 800 g.

The melting point of the resin is 89° C., the viscosity, determined as above, is 1200 mPa.s/20° C., and the B time of a mixture of 9 parts of resin and 1 part of hexamethylenetetramine is 2 minutes at 150° C.

EXAMPLE 8

Testing of the resins from Examples 3 to 7 for rubber-technological properties as a reinforcing resin with hexamethylenetetramine in the weight ratio 9:1.

The rubber-technological properties as a reinforcing resin are tested as in Example 1. The comparison resin used is the starting novolak from Example 1 (Alnovol VPN 1322). In Table 2 below, the columns Shore A, Modulus 10, Modulus 25 and Roll Bending Test (RB 15) have the same meaning as in Table 1 of Example 1. In addition, the columns G', G" and tan are given.

The elastic properties of rubber are described precisely in physical terms by means of the storage modulus G'. This corresponds to the proportion of work recovered after removing the applied tension. G' correlates with the hardness and should thus be as high as possible. The viscous content of the rubber is described by means of the loss modulus G". This characterizes the proportion of work converted into heat. G" correlates with the HBU and should be as low as possible.

The loss factor tan (= tangent of the phase angle d [tg d] in the final column is calculated from the quotient G"/G'.

TABLE 2

Testing of the rubber-technological properties of reinforcing resins

| Resin from | Shore A | Modulus 10 | Modulus 25 | RB 15 | G' | G" | tan (G"/G') |
|---|---|---|---|---|---|---|---|
| Ex. 3 | 85 | 1.7 | 2.4 | 41° C. | 31.0 | 3.64 | 0.118 |
| Ex. 4 | 87 | 2.5 | 3.3 | 60° C. | 43.6 | 5.50 | 0.127 |
| Ex. 5 | 86 | 2.6 | 3.5 | 60° C. | 50.0 | 5.60 | 0.133 |
| Ex. 6 | 87 | 1.6 | 2.1 | 39° C. | 36.8 | 4.32 | 0.116 |
| Ex. 7 | 90 | 2.1 | 2.7 | 45° C. | 44.2 | 5.62 | 0.128 |
| Alnovol VPN 1322 | 82 | 1.3 | 1.7 | 62° C. | 28.0 | 5.7 | 0.204 |

We claim:

1. A modified novolak resin produced by reacting a preformed novolak resin produced from (1) formaldehyde and (2) at least one phenol which is trifunctional with respect to formaldehyde, with (3) at least one terpene and (4) at least one ethylenically unsaturated carboxylic acid or a derivative thereof, the weight ratio between (3) and (4) being 98.5:2.5 to 2.5:98.5 and the weight ratio of (3) and the sum of the modifying components being 95:5 to 5:95 and the modified novolak has a melting part above 45° C.

2. A modified novolak as claimed in claim 1, wherein (3) comprises at least one terpene.

3. A modified novolak as claimed in claim 1, which contains components comprising unsaturated carboxylic acids having at least 4 carbon atoms.

4. A modified novolak resin of claim 1 wherein (4) is at least one ester or amide of an unsaturated carboxylic acid of at least four carbon atoms.

5. A modified novolak as claimed in claim 1, which contains components comprising tall oil fatty acids having a resin content of from 0.1 to 30% by weight, relative to the tall oil fatty acid.

6. A process for preparing the modified novolak of claim 1, comprising admixing unmodified novolak prepolymer with (3) and (4) and heating at temperatures between 80° and 300° C.

7. The process as claimed in claim 6 comprising admixing sulfuric acid as catalyst.

8. The process as claimed in claim 6 wherein the unmodified novolak is replaced by the phenol and aldehyde components thereof which are reacted with the modifying components in a one-pot process to obtain the modified novolak.

9. A method of reinforcing rubber and/or elastomers comprising incorporating into an unvulcanized rubber or elastomer mixture optionally containing cross-linking agents a reinforcing amount of a modified novolak of claim 1 and then vulcanizing the mixture.

10. The method of claim 9 wherein the unvulcanized rubber or elastomer mixture is first subjected to a preliminary reaction with a crosslinking agent.

11. A method of tackifying rubber comprising incorporating into an unvulcanized rubber mixture a tackifying amount of a modified novolak of claim 1 and then vulcanizing the mixture.

* * * * *